(12) United States Patent
Brown

(10) Patent No.: US 6,671,768 B1
(45) Date of Patent: Dec. 30, 2003

(54) SYSTEM AND METHOD FOR PROVIDING DYNAMIC CONFIGURATION ROM USING DOUBLE IMAGE BUFFERS FOR USE WITH SERIAL BUS DEVICES

(75) Inventor: Steven W. Brown, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/431,409

(22) Filed: Nov. 1, 1999

(51) Int. Cl.[7] .......................... G06F 12/00; G06F 13/00
(52) U.S. Cl. .......................... 711/102; 711/5; 711/170; 713/1; 713/100
(58) Field of Search ................................. 711/170, 102, 711/103, 5, 162; 710/101, 103, 104; 717/11; 714/6, 7; 713/1, 2, 100

(56) References Cited

U.S. PATENT DOCUMENTS

| | | | | |
|---|---|---|---|---|
| 5,568,641 A | * | 10/1996 | Nelson | 713/2 |
| 5,701,492 A | * | 12/1997 | Wadsworth et al. | 717/11 |
| 5,809,331 A | * | 9/1998 | Staats et al. | 710/10 |
| 5,835,761 A | * | 11/1998 | Ishii et al. | 713/2 |
| 5,938,764 A | * | 8/1999 | Klein | 713/1 |
| 5,987,605 A | * | 11/1999 | Hill et al. | 713/2 |
| 6,073,206 A | * | 6/2000 | Piwonka | 711/103 |
| 6,141,767 A | * | 10/2000 | Hu et al. | 714/1 |
| 6,167,532 A | * | 12/2000 | Wisecup | 714/23 |

* cited by examiner

Primary Examiner—Glenn Gossage
(74) Attorney, Agent, or Firm—Sierra Patent Group, Ltd.

(57) ABSTRACT

A system and method for providing dynamic configuration Read Only Memory (ROM) using double image buffers for use with serial bus devices. The dynamic configuration ROM may be updated while linked to the serial bus and with little or no risk of publishing inconsistent configuration ROM information to other nodes on the bus. The dynamic configuration ROM comprises first and second configuration ROM images, one set to active, the other set to update. The dynamic configuration ROM publishes the configuration entries from the active configuration ROM image. Modifications to the configuration ROM are stored in a database. The update configuration ROM image is constructed from entries made to the database. After the construction of the update configuration ROM image is completed, the dynamic configuration ROM switches the states of the ROM images and transmits a serial bus reset signal. Subsequently, the configuration entries from the newly active configuration ROM images are then published to the other nodes on the bus.

10 Claims, 3 Drawing Sheets

SYSTEM AND METHOD FOR PROVIDING DYNAMIC CONFIGURATION ROM USING DOUBLE IMAGE BUFFERS FOR USE WITH SERIAL BUS DEVICES

BACKGROUND OF INVENTION

1. Field of the Invention

This invention pertains generally to configuration Read Only Memory (ROM) implementations. More particularly, the invention is directed to a system and method for providing a dynamic configuration ROM using double image buffers for use with serial bus devices.

2. The Prior Art

In serial bus architecture, a node is an addressable entity (i.e., a logical entity with a unique address), which can be independently reset and identified. The address space provided by a node can be directly mapped to one or more units. A unit is a logical entity, such as a disk controller, which corresponds to unique I/O (input/output) driver software. On a multifunction node, for example, a processor and I/O interfaces can be different units on the same node.

Nodes can be interconnected using an appropriate physical topology suitable for use with the serial bus, such as a backplane environment and/or cable environment, for example. These environments are described in further detail in Institute of Electrical and Electronics Engineers (IEEE) Standard 1394–1995 "IEEE Standard for a High Performance Serial Bus," published Aug. 30, 1996 which is incorporated herein by reference. Interconnected nodes may reside in either environment without restriction.

Configuration ROM implementations are well known in the field of serial bus devices and provide the hardware and software specifications of a serial bus node and its associated units. For example, in IEEE Standard 1394, two configuration ROM formats are supported: minimal and general. The minimal ROM format provides a 24 bit company identifier. The general ROM format provides additional information in a bus_info_block and a root_directory. Entries within the root_directory may provide information or may provide a pointer to another directory (root-dependent directory and/or unit_directory), which has the same structure as the root_directory. Entries within the root_directory may also provide a pointer to a leaf, which contains information. The unit_directories contain information about the units associated with the node, such as their software version number and their location within the address space of the node, for example.

FIG. 1 shows a general ROM implementation format for IEEE Standard 1394. The ROM directory structure is a hierarchy of information blocks, where the blocks higher in the hierarchy point to the blocks beneath them. The location of the initial blocks (info_length, crc_length, rom_crc_value, bus_info_block, and root_directory) are fixed. The location of the other entries (unit_directories, root and unit leaves, and vendor dependent information) varies according to each vendor, but are specified by entries within the root_directory or its associated directories.

In general, the bus_info_block provides specific information about the node. For example, the bus_info_block may indicate whether the node carries out isochronous data transfers. Additionally, the bus_info_block provides a node_vendor_id field, a chip_id_hi field, and a chip_id_lo field, among other things. Together, the node_vendor_id, chip_id_hi, and chip_id_lo fields forms a 64-bit node unique identifier. Other node specific information may be provided in the root_directory and the root leaves of the ROM. Unit specific information is normally provided in the unit_directory and the unit leaves of the ROM. For example, the specification identification and the version number may be provided for a particular protocol in the unit_directory and the unit leaves. IEEE Standard 1394–1995 "IEEE Standard for a High Performance Serial Bus," published Aug. 30, 1996, describes the general ROM format and its associated blocks in further detail and is incorporated herein by reference.

The configuration ROM is published to other nodes on the bus. That is, nodes on the bus may access some known address space on any node to read or otherwise ascertain that node's configuration ROM information at any time. Certain nodes (management entities) that carry out the operation of controlling other nodes proactively ascertain the configuration ROM information contained in other devices on the bus.

Originally, configuration ROM implementations were intended to be static and unchanging. As such, the configuration ROM information image provided to the other nodes on the bus remains fixed during the operation of the node. However, it may be desirable to scale the capabilities of a node while the node is already operational. For example, a node may want to provide an additional protocol service or an additional unit device, for example. However, the addition of a protocol or a unit device, in the above example, would require modification of the configuration ROM in order to publish the availability of the new unit architecture represented by the added protocol or unit device. Similarly when an existing software service (a protocol service, for example) is removed from the node, the configuration ROM would need to be updated to publish the unavailability of the removed software service.

Traditionally, changing or modifying the configuration ROM while "active" and available to the other nodes on the bus may result in inconsistent configuration ROM data. This inconsistency may result when, for example, a node is reading the ROM while the ROM is being updated. The requesting node may read the incorrect rom_crc_value, for example, because unit directories and unit leaves are being added for the newly added unit architecture. Thus, it would be a disadvantage to update or modify an active configuration ROM available to the other nodes on the bus.

In order to scale a node (i.e., add or remove a unit for the node) according to the prior art, the node would have to be unlinked from the serial bus. Once unlinked from the serial bus, the configuration ROM is unavailable to the other nodes. Updates can then be made to the configuration ROM of the unlinked node without the risk of publishing inconsistent ROM data to the other nodes, as described above. After ROM update, the node can then link back to the serial bus and republish the newly updated configuration ROM information.

Accordingly, there is a need for a system and method for providing a dynamic configuration ROM which may be updated while inked to the serial bus and without risk of providing inconsistent configuration ROM information to the other nodes on the bus. The present invention satisfies these needs, as well as others, and generally overcomes the deficiencies found in the background art.

An object of the invention is to provide a system and method for providing a dynamic configuration ROM which overcomes the deficiencies in the prior art.

Another object of the invention is to provide a system and method for providing a dynamic configuration ROM in a node device wherein the configuration ROM may be updated while the node is active and linked with other devices.

Another object of the invention is to provide a system and method for providing a dynamic configuration ROM in a node device which provides double ROM image buffers, one of which is active and the other of which is modifiable.

Another object of the invention is to provide a system and method for providing a dynamically modifiable configuration ROM in a node device which provides services to publish the dynamically modifiable configuration ROM.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE INVENTION

The present invention is directed to a system and method for providing a dynamic configuration ROM that may be updated while active and linked to the serial bus. The system and method of the present invention allow the update of the configuration ROM without the risk of publishing inconsistent configuration ROM information to the other nodes on the bus. The system and method of the invention relate to machine-readable media on which are stored embodiments of the present invention. It is contemplated that any media suitable for retrieving instructions is within the scope of the present invention. By way of example, such media may take the form of magnetic, optical, or semiconductor media. The system and method of the invention also relate to data structures that contain embodiments of the present invention, and to the transmission of data structures containing embodiments of the present invention.

In its most general terms, the invention comprises configuration ROM software executing within a local node which provides services to modify the configuration ROM of a node and services to publish the modified configuration ROM. The software is executed by a conventional processor within the serial bus device as is known in the art. While the illustrative embodiment is described herein using IEEE Standard 1394 topology, the invention is suitable for use with other topologies including those complying with IEEE Standard 1212, for example.

The invention provides first and second configuration ROM images. The ROM images are provided in random access memory (RAM) within the local node. The first ROM image is initially set as the "active" ROM and contains the configuration ROM entries for the node as well as currently operating units, if any. The second ROM image is initially set as the "update" ROM and is, although not required, normally empty. The "update" ROM is where new and/or updated entries to the config ROM will be constructed. During operation the invention sets the second ROM to "active" and the first ROM to "update", and vice versa according to algorithm set forth in the invention as described further below. The invention "tracks" the active ROM by, for example, providing a pointer to the "active" ROM.

The invention publishes the currently "active" configuration ROM to the other nodes on the serial bus. In operation, when a node on the serial bus queries the local node for its configuration ROM, the local node provides the entries from the "active" configuration ROM. The "update" ROM is not published to other nodes on the bus. Rather the "update" ROM serves as a "buffer" where new and/or updated entries may be constructed, as described further below. For example, new configuration ROM entries may be added by a user via ROM building services. These entries are stored into a data storage structure, such as a database, for example. At the time the user determines that the new and/or updated entries should be published, the invention constructs the modified ROM in the "update" ROM from the database. After the construction of the "update" ROM is completed, the entries provided in the "update" ROM is published to the other nodes on the bus using the publishing means of the present invention as described further below.

The invention provides ROM building services to the higher layers (the application layer, for example) of the local node to add and/or modify entries to the configuration ROM of the node. For example, a software client running in the local node may add ROM entries for a protocol service that was added during the operation of the node. These entries are stored into a data storage structure, such as a ROM database table, for example. A new entry may thus be stored into a new data record of the table. The data record entries in the ROM database may later be constructed into the appropriate configuration ROM format in the "update" ROM just before publication. In this way, the constructed "update" ROM will have a new unit directory and new unit leaves to indicate the added protocol's version number and other pertinent protocol information, for example. Other entries of the "update" ROM will also be modified from their original values, such as the rom__crc__value and the root__ directory, as is known in the art. Similarly, entries in the ROM database may be deleted and/or modified when a service is removed from the node.

These changes to the configuration ROM maintained in the ROM database may be made while the node is active and linked to the serial bus. The local node may continue to provide the configuration information from the information in the "active" ROM, while the ROM database is being modified. Because the data in the ROM database and the "update" ROM are not published, the risk of inconsistencies in configuration ROM entries provided by the local node is thusly reduced or avoided. Once the modification is complete, the invention provides services to publish the modifications made to the ROM database on the serial bus.

The invention provides services to construct the "update" ROM from the ROM database and to publish modification made to the "update" ROM. During the process of publishing modified information, the invention carries out several operations. First, the invention constructs the "update" ROM using the proper configuration ROM format from the data in the ROM database. In the present example, the configuration ROM format is that described in FIG. 1. Next, the invention switches the states of the configuration ROM images. For example, if the first ROM is currently set as "active" and the second ROM is currently set as "update", the invention sets the first ROM as "update" and the second ROM as "active". If, on the other hand, the first ROM is currently set as "update" and the second ROM is currently set as "active", the invention sets the first ROM as "active" and the second ROM as "update".

Immediately after the states of the configuration ROM images are switched, the invention signals or otherwise initiates a bus reset. In IEEE Standard 1394 following a bus reset occurs, the nodes on the bus, among other things, may rescan the bus and re-read the configuration ROM address space of the local node. Since the "active" ROM now contains the modified entries for the configuration ROM of the local node, the local node now is presented as having the newly modified (added or removed) services. As noted above, certain nodes (management entities) that carry out the operation of "controlling" other nodes proactively ascertain the configuration ROM information contained in other devices on the bus. With the present invention, these controlling nodes are able to recognize and make use of the newly available capabilities of the modified node.

Further modifications can be made to the ROM database, as described above, and the process of publishing such additional modifications to the local node's configuration ROM is repeated.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art Will realize that the following description of the present invention is illustrative only and not in any way limiting. Other embodiments of the invention will readily suggest themselves to such skilled persons having the benefit of this disclosure.

Figure 2A:
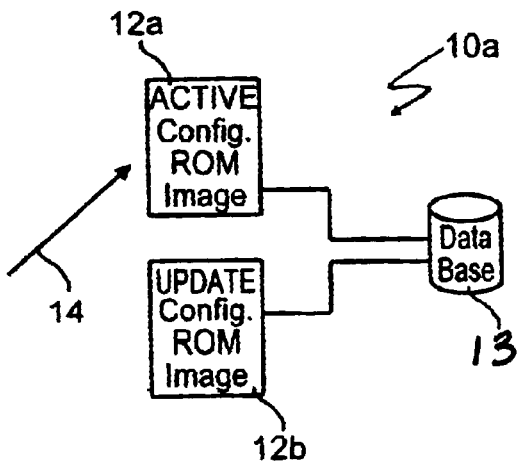
FIG. 2a is a block diagram showing generally a dynamic configuration ROM having first and second configuration ROM images according to the present invention, where the first ROM is image set as active, and the second ROM is image set as update.
Figure 2B:
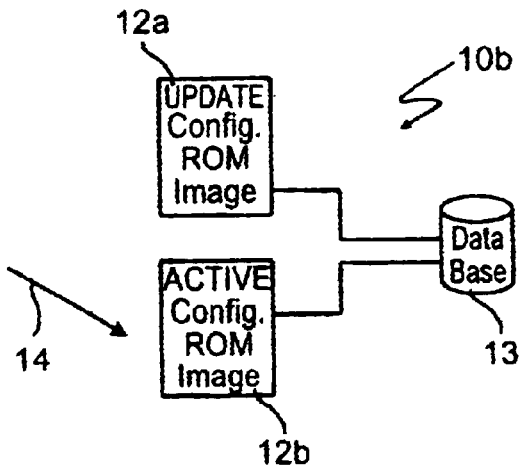
FIG. 2b is a block diagram showing generally a dynamic configuration ROM having first and second configuration ROM images according to the present invention, where the fast ROM image is set as update, and the second ROM image is set as active.
Figure 3A:
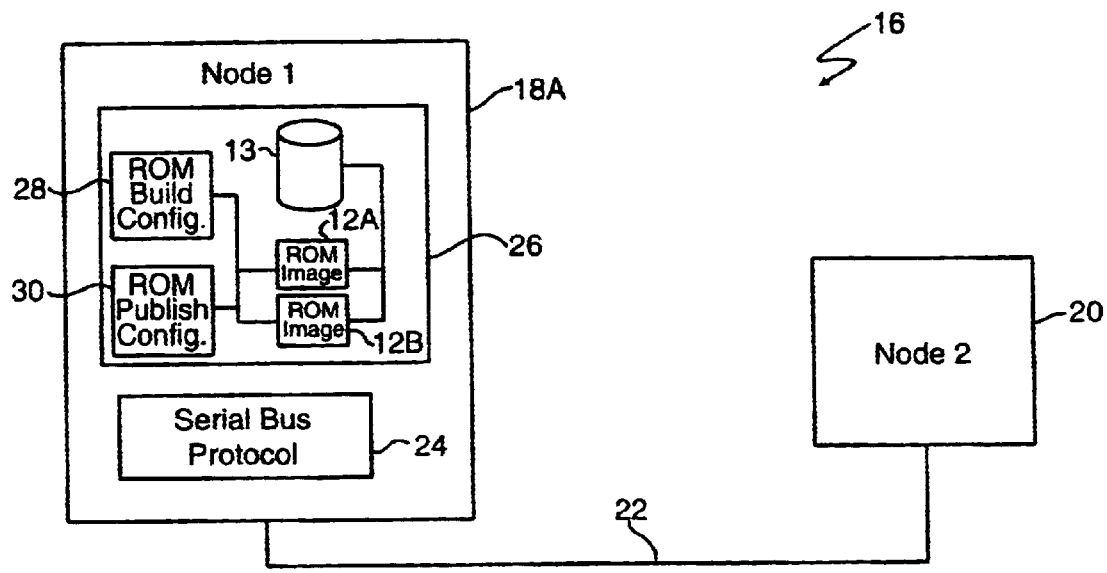
FIG. 3a is a block diagram showing an illustrative system suitable for use with the present invention having a local node device with a first unit.
Figure 3B:
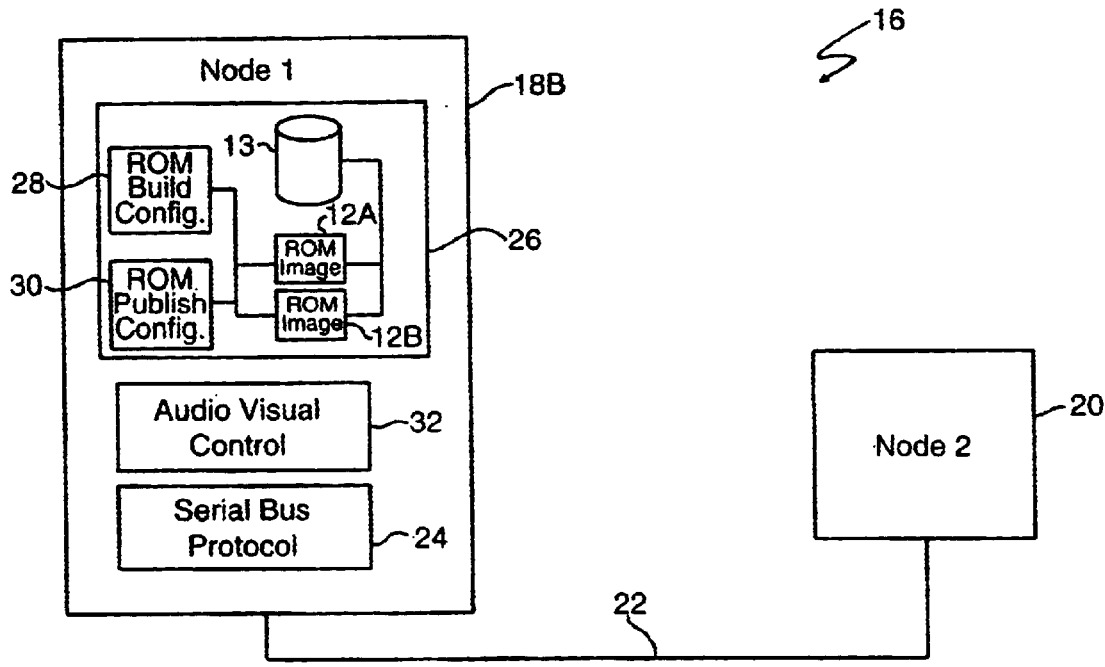
FIG. 3b is a block diagram showing an illustrative system suitable for use with the present invention having a local node device with a first unit and a second unit.
Figure 4:
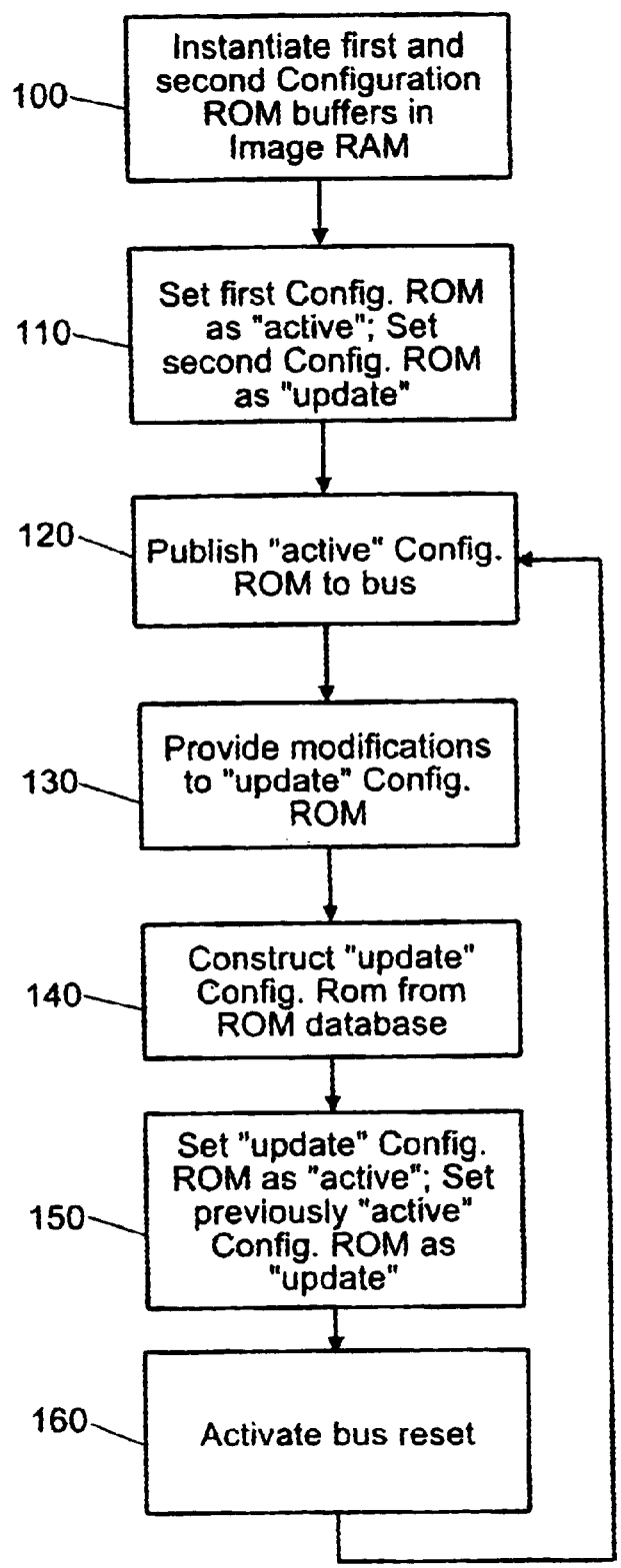
FIG. 4 is a flow chart showing generally the acts for providing dynamic configuration ROM using double image buffers in accordance with the present invention.

Referring more specifically to the drawings, for illustrative purposes the present invention is embodied in FIG. 1 through FIG. 3b and the method outlined in FIG. 4. It will be appreciated that the apparatus may vary as to configuration and as to details of the parts, and that the method may vary as to details and the order of the acts, without departing from the basic concepts as disclosed herein. The invention is disclosed generally in terms of a method for providing dynamic configuration ROM across serial bus using double image buffers, although numerous other uses for the invention will suggest themselves to persons of ordinary skill in the art.

Referring first to FIG. 2a, there is shown generally a block diagram showing generally a dynamic configuration ROM 10a in accordance with the present invention. The dynamic configuration ROM comprises first configuration ROM image 12a and second configuration ROM image 12b. Each of the ROM images 12a, 12b comprises a storage structure suitable for storing configuration ROM entries as is known in the art. Normally first and second ROM images 12a, 12b each stores ROM information in conventional random access memory (RAM) within the local node.

Initially, during the start-up process of the local node, the state of the first ROM image 12a is set to active and the state of the second ROM image 12b is set to update. A pointer 14 may be used to track which of the two ROM images 12a, 12b is currently set to active, although other means known in the art for tracking the state of the ROM images 12a, 12b may be used.

The ROM images 12a, 12b contain configuration ROM entries as is known in the art. For example, in an IEEE Standard 1394 bus topology, the configuration ROM images 12a, 12b may contain entries as depicted in PIG. 1. As described above, the configuration ROM information is used by other devices on the bus to ascertain the hardware and software specifications of the local node.

When the local node is linked or attached to the bus, the node publishes its configuration ROM to the other nodes on the bus by presenting configuration ROM information from the ROM image which is set as "active". As described above, the configuration ROM information is used by other devices on the bus to ascertain the hardware and software specifications of the local node. In general, the configuration data specified in the "active" ROM image is communicated to other nodes requesting [for] the configuration ROM information of the local node. The configuration ROM entries in the "update" ROM are not presented to the other nodes, but is used for modifying the configuration ROM of the local node.

The update ROM is provided as a buffer for the local node. Providing an update ROM permits the local node to accept modification to the configuration ROM, while allowing the local node to continue publishing the node's configuration ROM as represented in the active ROM. The configuration ROM may be modified for a variety of reasons, but is modified normally to scale the capabilities of the local node. For example, the local node may dynamically add and/or remove protocols for the local node. In the case where a protocol is added, the configuration ROM is usually modified to add a unit directory and unit leaves for the entries associated with the added protocol. Also, other blocks of the configuration ROM may need to be modified as is known in the art.

In the preferred embodiment, changes to the configuration ROM are stored into a data storage structure, such as a database 13, which is coupled to each of the ROM images 12a, 12b. In this way, new entries added by a user may be stored into a new data record in the database 13, and deleted entries may be removed from the database 13. The entries in the database 13 may then be used to construct a modified "update" ROM image using the proper configuration ROM format, which in the present example complies with IEEE Standard 1394.

FIG. 2b depicts a dynamic configuration ROM 10b in accordance with the present invention where the states of the first and second ROM image 12a, 12b are reversed from that depicted in FIG. 2a. In FIG. 2b, first ROM image 12a is set to update while the second ROM image 12b is set to active. The pointer 14 tracks the active ROM which in FIG. 2b is second ROM image 12b.

The states of the ROM images 12a, 12b are controlled by the publishing services of the present invention. As noted above, initially, the first ROM image 12a is set to "active". However, during the operation of the node, a software client may add additional capabilities to the node, initially to the database 13 and ultimately to the constructed "update" ROM image 12b. In order to "publish" these added capabilities, the invention switches the states of ROM images 12a, 12b and initiates a bus reset. When the states of the ROM images 12a, 12b are switched, the first ROM image 12a (originally "active") is set to "update" and the second ROM image (originally "update") is set to "active" so that the added entries to the second ROM image 12b (now "active") are published to the nodes on the bus.

According to the present invention the local node only publishes the configuration data specified in the active ROM as described above. The configuration data specified in the database 13 and the update ROM is not published. The publishing services must first switch a ROM image 12a, 12b to active (and cause a bus reset) before configuration data in that ROM image is provided to the other nodes. Thus, only a completely modified ROM image is presented to the bus, thereby avoiding or greatly minimizing publishing inconsistent configuration ROM data.

The publishing services, in addition to controlling the states of the ROM images 12a, 12b as described above, also carry out a bus reset immediately after the states of the ROM images 12a, 12b are switched. When the other nodes on the bus sense the bus reset signal issued by the local node, the other nodes will, among other things, rescan the bus to re-read configuration ROM address space of the local node to determine the modified configuration ROM information. While in the IEEE 1394 environment, a bus reset is used to cause the other nodes to rescan the bus, other like signaling means may be used in other topologies to similarly cause the other nodes to rescan the bus.

Figure 1:
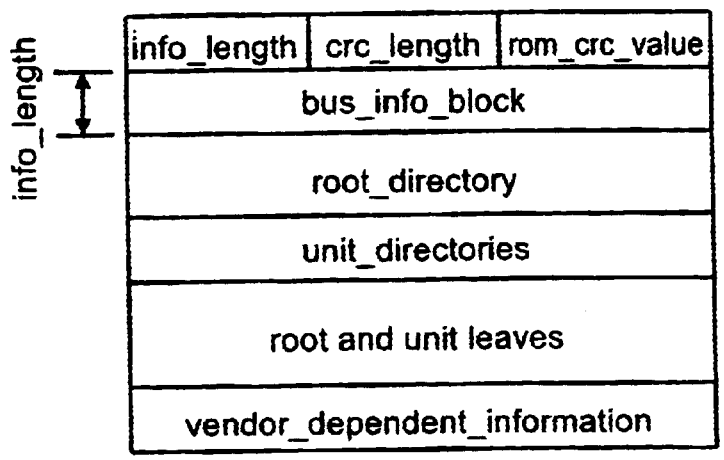
FIG. 1 is a block diagram showing a general configuration ROM format according to the IEEE Standard 1394.

Referring next to FIG. 3a, as well as FIG. 1 through FIG. 2b, there is shown an illustrative system 16 suitable for use with the present invention. System 16 includes a local node 18a operatively coupled to a personal computer (PC) node 20. The PC node 20 may be any standard computer or data processing means comprising a CPU, memory, a storage device and other input/output means such as a keyboard, mouse and a display monitor. The local node 18a may be any serial bus device according to IEEE Standard 1394. The local node 18a is connected to the PC node 20 via a IEEE 1394 bus connection (bus) 22. The local node 18a further includes a serial bus protocol (SBP) unit 24 provided therein. The SBP unit 24 may be a disk controller, for example, which provides services to the other nodes on the bus.

The local node 18a further includes a dynamic configuration ROM software 26 according to the present invention operating in the RAM of node 18a and as described above in conjunction with FIG. 2a and FIG. 2b. ROM software 26 includes ROM database 13 coupled to ROM images 12a, 12b. The ROM software 26 also includes a ROM building component 28 and a publishing component 30, each coupled to the ROM database 13, and the ROM images 12a, 12b. ROM building component 28 receives and carries out commands from a user to add, delete, or modify ROM entries to the ROM database 13. The publishing component 30 allows the user to publish the changes to configuration ROM in the ROM database 13 by constructing the "update" ROM image, switching the states of the ROM images, and publishing the newly activated ROM, as described further below.

Initially the ROM 26 is structured and configured with ROM image 10a as depicted in FIG. 2a where the first ROM image 12a is set to "active". The configuration ROM 26 contains configuration information related to the node 18a, including the configuration data for SBP unit 24. Since PC node 20 is a "controlling" device, PC node 20 will proactively read configuration ROMs available on the bus 22. PC node 20 is able to ascertain the configuration ROM 26 of node 18a by accessing some known address space on local node 18a as is known in the art, wherein the configuration data provided to PC node 20 is constructed from the entries in the "active" ROM image of ROM 26, currently ROM image 12a.

At some later time, a software client (not shown) executing in the local node 18 may discover that an additional capability needs to be published in the configuration ROM software 26 of local node 18. FIG. 3b depicts system 16 where such additional capabilities have been added to the local node, depicted as 18b. In FIG. 3b, the local node 18b comprises a SBP unit 24 and a dynamic configuration ROM software 26. Furthermore, local node 18b includes an added capability, an audio visual control (AV/C) unit 32, for example.

In order to publish the AV/C unit 32 to the bus 22, the ROM building component 28 in the ROM 26 receives, from the software client, addition and/or modification requests which are executed on the ROM database 13. For example, a unit directory entry and entries for unit leaves for the AV/C unit 32 will be added to the database 13, and other entries, such as the rom_crc_value and the root_directory will be modified. After all the modifications and additions to the ROM database 13 have been made, a modified configuration ROM can be constructed in the "update" ROM image, which may then be published.

When the publishing component 30 receives a "publish signal" from the software client, the publishing component 30 of the configuration ROM software 26 constructs the modified configuration ROM image in the "update"ROM image from the entries in the ROM database 13 using an appropriate configuration ROM format. For example, in the present example, using IEEE Standard 1394 bus topology, an appropriate configuration ROM format is represented in FIG. 1. The publishing component 30 then switches the states of the ROM images 12a, 12b. In the present example, the ROM image 12a (presently "active") is set to "update", and ROM image 12b (presently "update") is set to "active", and dynamic configuration ROM software 26 is structured and configured as ROM 10b of FIG. 2b. After the states of the ROM images 12a, 12b are switched, the modifications previously made are provided in the newly "active" ROM image 12b. The situation would be reversed if the states of the ROM images were reversed (i.e., ROM image 12a would be set to "active" if presently "update", and ROM image 12b would be set to "update" if presently "active").

Immediately after the states of the ROM images are switched, the publishing component 30 initiates a bus reset signal on the bus 22. The bus reset signals to the other node devices that the state of the bus 22 has changed. In response to a bus reset, controlling devices on the bus 22, such as PC node 20, proactively seek out configuration ROM changes to other nodes on the bus 22, and thereby ascertain configuration ROM changes to the local node 18b represented by the new and/or modified entries published by the configuration ROM 26 from the newly "active"ROM image 12b.

Subsequent changes to local node 18 can be made to the ROM database 30, and the procedure outlined above, for publishing these changes, is repeated.

The method and operation of the invention will be more fully understood by reference to the flow chart of FIG. 4, as well as FIG. 1 through FIG. 3b. FIG. 4 illustrates generally the actions associated with providing dynamic configuration ROM using double image buffers in accordance with the present invention. The order of operation as shown in FIG.

4 and described below are only exemplary, and should not be considered limiting.

At step 100, local node 18a is initiated and is linked to the bus 22. During initiation, configuration ROM software 26, which is operating in local node 18a, instantiates first and second Configuration ROM image buffers 12a, 12b in RAM. Each of the ROM image buffers 12a, 12b are structured and configured to store configuration ROM entries information as is known in the art. For example, ROM image buffers 12a, 12b are structured and configured to store the general ROM image information as depicted in FIG. 1. ROM database 13 is also created for receiving configuration ROM changes from the user or client and generating the update ROM image. Step 110 is then carried out.

At step 110, the configuration ROM software 26 sets the state of the first ROM image 12a to active and the state of the second ROM image 12b to update. Thus ROM 26 is initially structured and configured as ROM 10a of FIG. 2a. Additionally, configuration ROM entries as is known in the art are constructed in the ROM images 12a, 12b. Configuration ROM entries are also stored in the ROM database 13 using any conventional structure such a table, relation table, tree, b-tree, or other appropriate structure as is known in the art Initially, local node 18a (depicted in FIG. 3a) is shown with a single unit device, SBP unit 24, provided therein. As such, ROM image 12a (active) initially contains configuration information related to the node 18a, including the configuration is data for SBP unit 24, while ROM image 12b (update) is initially empty. Step 120 is then carried out.

At step 120, the configuration ROM software 26 in the local node publishes the information contained within the "active" ROM (initially 12a) to the other. nodes, such as PC node 20, on the bus 22. As described above, other nodes on the bus, such as PC node 20, are able to ascertain the configuration ROM 26 of node 18a by accessing some known address space on local node as is known in the art, wherein the configuration data provided to such other nodes is constructed from the entries in the "active" ROM image of ROM 26, which is ROM image 12a after initial startup, but may be ROM image 12b after one or more state switches of ROM 26 are carried out, as described above. As noted above, the information in the "update" ROM image is not published during this step. Also, record entries in the ROM database 13 are not published during this step. Step 130 is then carried out.

At step 130, the configuration ROM software 26 provides services (via ROM building component 28) to a software client running in local node 18a (or 18b) to make modification to the configuration ROM of local node 18a (or 18b). For example, as described above, the software client may decide to add the services of an AV/C unit 32 to the local node (as depicted in FIG. 3b). To this end, the software client may add and/or modify entries to the ROM database 13 to thereby add record entries for a unit directory and unit leaves for the AV/C unit 32, and modify other entries, such as the rom_crc_value and the root_directory. Step 140 is then carried out.

At step 140, the configuration ROM software 26 constructs an updated Configuration ROM in the update ROM (initially, 12b) for the record entries in the ROM database 13 using the proper configuration ROM format for the node 18b. Step 150 is then carried out.

At step 150, the publishing component 30 of the configuration ROM software 26 switches the states of the ROM images 12a, 12b. In the present example, the ROM image 12a (initially "active") is set to "update", and ROM image 12b (initially "update") is set to "active", and ROM 26 is structured and configured as ROM 10b of FIG. 2b. After the states of the ROM images 12a, 12bare switched, the modifications previously made (in the ROM database 13 and constructed in the "update" ROM) are provided in the newly "active" ROM image. The situation would be reversed if the states of the ROM images were reversed. That is, ROM image 12a would be set to "active" if presently set as "update", and ROM image 12b would be set to "update" if presently set as "active". Step 160 is then carried out.

At step 160, the configuration ROM software 26 initiates a bus reset signal to the bus 22. As described above, the bus reset signals to the other node devices that the state of the bus 22 has changed. In response to a bus reset, controlling devices on the bus 22, such as PC node 20, proactively seek out configuration ROM changes to other nodes on the bus 22, and thereby ascertain configuration ROM changes to the local node 18b. Step 120 is carried out again to publish the new and/or modified entries provided by the configuration ROM 26 and constructed from the newly active ROM image.

Steps 120 through 160 may be repeated again for additional changes to capabilities associated with local node (18a, 18b). Units may be added and removed from the local node while the node is active and linked to other devices via bus 22. The configuration ROM software 26 executing in the local node is able to make additional configuration ROM changes to the buffer (i.e., the ROM database 13 and the update ROM image) while the current ROM configuration is published from the active ROM image.

Accordingly, it will be seen that this invention provides a system and method for providing a dynamic configuration ROM which uses double image buffers and which allows the update of the configuration ROM without the risk of publishing inconsistent configuration ROM information to the other nodes on the bus. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for providing dynamic configuration Read Only Memory in a local node comprising:

providing first and second configuration ROM images in said local node;

setting said first configuration ROM image as an active configuration ROM image;

setting said second configuration ROM image as an update configuration ROM image; and publishing configuration ROM information of said local node from said active configuration ROM image by initiating a bus reset that causes other nodes to scan a bus and read said configuration information of said local node.

2. The method of claim 1, further comprising:

providing modifications to said update configuration ROM image; and switching the state of the active and update configuration ROM images before initiating the bus reset.

3. The method of claim 2, further comprising republishing said configuration ROM information of said local node from said active configuration ROM image.

4. The method of claim 2, wherein said providing of modifications comprises:

storing modifications into a database and constructing said update configuration ROM image from said database.

5. The method of claim 2, wherein the switching of the state of the active and update configuration ROM images comprises:

setting the current active configuration ROM image to update; and setting the current update configuration ROM image to active.

6. A program storage device readable by a machine, tangibly embodying a program of instructions executable by the machine to perform a method for providing dynamic configuration Read Only Memory in a local node, said program storage device comprising instructions for:

providing first and second configuration ROM images in said local node;

setting said first configuration ROM image as an active configuration ROM image;

setting said second configuration ROM image as an update configuration ROM image; and publishing configuration ROM information of said local node from said active configuration ROM image by initiating a bus reset that causes other nodes to scan a bus and read said configuration ROM information of said local node.

7. The program storage device of claim 6, further comprising instructions for:

providing modifications to said update configuration ROM image; and switching the state of the active and update configuration ROM images before initiating a bus reset.

8. The program storage device of claim 7, further comprising instructions for republishing said configuration ROM information of said local node from said active configuration ROM image.

9. The program storage device of claim 7, wherein said instructions for providing modifications comprise instructions for:

storing modifications into a database and constructing said update configuration ROM image from said database.

10. The program storage device of claim 7, wherein said instructions for switching the state of the active and update configuration ROM images comprise instructions for:

setting the current active configuration ROM image to update; and setting the current update configuration ROM image to active.

* * * * *